(12) United States Patent
Rowitch et al.

(10) Patent No.: US 7,359,716 B2
(45) Date of Patent: Apr. 15, 2008

(54) LOCATION BASED SERVICE (LBS) SYSTEM, METHOD AND APPARATUS FOR AUTHORIZATION OF MOBILE STATION LBS APPLICATIONS

(76) Inventors: Douglas Rowitch, 2009 De Mayo Rd., Del Mar, CA (US) 92014; Kirk Burroughs, 174 Canyon Vista Pl., Alamo, CA (US) 94507

( * ) Notice: Subject to any disclaimer, the term of this patent is extended or adjusted under 35 U.S.C. 154(b) by 142 days.

(21) Appl. No.: 10/769,420

(22) Filed: Jan. 30, 2004

(65) Prior Publication Data

US 2004/0248551 A1 Dec. 9, 2004

Related U.S. Application Data

(60) Provisional application No. 60/445,815, filed on Feb. 5, 2003, provisional application No. 60/444,248, filed on Jan. 31, 2003.

(51) Int. Cl.
*H04Q 7/20* (2006.01)
(52) U.S. Cl. .............. 455/456.3; 455/411; 340/539.12; 709/229; 726/2; 726/4
(58) Field of Classification Search ............ 455/414.1, 455/414.2, 414.3, 411, 461, 456.3, 456.2, 455/418, 419, 420, 456.1; 701/207, 208, 701/209, 211, 213, 226; 340/426.19, 539.13, 340/991, 993, 988, 995.25; 709/217–219, 709/229; 726/2–4
See application file for complete search history.

(56) References Cited

U.S. PATENT DOCUMENTS

| | | | | |
|---|---|---|---|---|
| 445,118 | A | * | 1/1891 | Krieger et al. ................ 70/233 |
| 5,589,835 | A | * | 12/1996 | Gildea et al. .......... 342/357.03 |
| 5,841,396 | A | * | 11/1998 | Krasner ................... 342/357.1 |
| 5,872,539 | A | * | 2/1999 | Mullen ................... 342/357.08 |

(Continued)

FOREIGN PATENT DOCUMENTS

WO    02058414    7/2002

OTHER PUBLICATIONS

International Search Report ISA EPO PCT/US2004/002938 Oct. 4, 2004.

(Continued)

*Primary Examiner*—William Trost
*Assistant Examiner*—James D Ewart
(74) *Attorney, Agent, or Firm*—Thomas Rouse; Rich Bachand; Linda G. Gunderson (57) ABSTRACT

A system, method and apparatus for providing location services whereby location determination and location disclosure are treated as separate and independent processes. Location determination may be performed (as necessary) via a first set of network entities to obtain location information for a mobile station. The location information may be cached for subsequent disclosure to any number of applications. Location disclosure may be performed (when requested) via a second set of network entities to provide the location information. Location determination may utilize a first security procedure for authorization and to obtain a first session key used for location determination. Location disclosure may utilize a second security procedure for authorization and to obtain a second session key used for location disclosure. For a roaming mobile station, location determination may be performed via a serving network and location disclosure may be performed via a home network.

23 Claims, 6 Drawing Sheets

U.S. PATENT DOCUMENTS

| | | | | |
|---|---|---|---|---|
| 5,913,170 | A * | 6/1999 | Wortham | 455/457 |
| 5,999,125 | A * | 12/1999 | Kurby | 342/357.1 |
| 6,070,078 | A * | 5/2000 | Camp et al. | 455/456.2 |
| 6,085,099 | A | 7/2000 | Ritter et al. | 455/466 |
| 6,112,078 | A | 8/2000 | Sormunen et al. | 455/411 |
| 6,133,874 | A * | 10/2000 | Krasner | 342/357.15 |
| 6,138,003 | A * | 10/2000 | Kingdon et al. | 455/410 |
| 6,150,980 | A * | 11/2000 | Krasner | 342/357.1 |
| 6,266,533 | B1 * | 7/2001 | Zadeh et al. | 455/456.2 |
| 6,429,808 | B1 * | 8/2002 | King et al. | 342/357.02 |
| 6,456,843 | B1 | 9/2002 | Daly | 455/419 |
| 6,535,815 | B2 * | 3/2003 | Bloebaum | 701/213 |
| 6,625,458 | B2 * | 9/2003 | Pihl et al. | 455/456.1 |
| 6,754,482 | B1 * | 6/2004 | Torabi | 455/410 |
| 6,937,865 | B1 * | 8/2005 | Bloebaum et al. | 455/456.1 |
| 6,957,073 | B2 * | 10/2005 | Bye | 455/456.1 |
| 6,987,964 | B2 * | 1/2006 | Obradovich et al. | 455/414.1 |
| 6,993,429 | B2 * | 1/2006 | Obradovich et al. | 701/200 |
| 7,043,363 | B2 * | 5/2006 | Yamamoto et al. | 701/213 |
| 7,076,256 | B1 * | 7/2006 | Orler et al. | 455/456.1 |
| 2001/0018663 | A1 * | 8/2001 | Dussell et al. | 705/9 |
| 2002/0029108 | A1 * | 3/2002 | Liu et al. | 701/208 |
| 2002/0094822 | A1 * | 7/2002 | Anctil et al. | 455/456 |
| 2002/0101374 | A1 * | 8/2002 | Mutoh et al. | 342/357.09 |
| 2002/0102988 | A1 * | 8/2002 | Myllymaki | 455/456 |
| 2002/0115453 | A1 | 8/2002 | Poulin et al. | |
| 2002/0154058 | A1 * | 10/2002 | Pande et al. | 342/357.09 |
| 2002/0160766 | A1 | 10/2002 | Portman et al. | |
| 2002/0177449 | A1 | 11/2002 | McDonnell et al. | |
| 2002/0177949 | A1 * | 11/2002 | Katayama et al. | 701/211 |
| 2002/0196189 | A1 * | 12/2002 | Choi | 342/457 |
| 2003/0069694 | A1 * | 4/2003 | Fuchs et al. | 701/213 |
| 2003/0070091 | A1 * | 4/2003 | Loveland | 713/201 |
| 2003/0087629 | A1 * | 5/2003 | Juitt et al. | 455/411 |
| 2003/0119528 | A1 | 6/2003 | Pew et al. | |
| 2004/0064707 | A1 * | 4/2004 | McCann et al. | 713/185 |
| 2004/0073365 | A1 * | 4/2004 | Alanen et al. | 701/213 |
| 2004/0139204 | A1 * | 7/2004 | Ergezinger et al. | 709/229 |
| 2004/0148090 | A1 * | 7/2004 | Melen | 701/200 |
| 2004/0203903 | A1 * | 10/2004 | Wilson et al. | 455/456.1 |
| 2004/0235454 | A1 | 11/2004 | Rowicth et al. | |
| 2004/0242209 | A1 * | 12/2004 | Kruis et al. | 455/414.1 |
| 2005/0128102 | A1 * | 6/2005 | Obradovich et al. | 340/905 |

OTHER PUBLICATIONS

International Search Report ISA EPO PCT/US2004/002936 Oct. 4, 2004.

* cited by examiner

LOCATION BASED SERVICE (LBS) SYSTEM, METHOD AND APPARATUS FOR AUTHORIZATION OF MOBILE STATION LBS APPLICATIONS

RELATED APPLICATIONS

This application claims the benefit of provisional U.S. Application Ser. No. 60/444,248, filed on Jan. 31, 2003 and U.S. Provisional Application Ser. No. 60/445,815, filed Feb. 5, 2003.

BACKGROUND

1. Field

The present invention relates generally to communication, and more specifically to a system, method and apparatus for performing location determination and providing location information via a location based services (LBS) architecture.

2. Background

Often, it is desirable to know the location of a wireless user. In fact, it is sometimes necessary. For example, the Federal Communications Commission (FCC) has adopted a report and order for an enhanced 911 (E-9-1-1) wireless service that requires the location of a mobile station (e.g., a cellular phone) to be provided to a Public Safety Answering Point (PSAP) each time a 911 call is made from the mobile station. In addition to the FCC mandate, a network operator/service provider may support various applications that use location based services. Such services provide the location of mobile stations. "Applications" refer to the particular uses that are made of location information. Often times, applications are implemented with computer software that is either executed by a processor within a mobile station or by a processor located within a wireless infrastructure network that is in communication with the mobile station. Applications that use this information may include, for example, location-sensitive billing, asset tracking, asset monitoring and recovery, fleet and resource management, personal-location services, and so on. Some specific examples of applications for personal-location services include (1) providing a local map to a mobile station based on its location, (2) providing a recommendation for a facility (e.g., a hotel or a restaurant) based on the mobile station's location, and (3) providing directions to the recommended facility from the mobile station's location.

Currently, use of location based services (i.e., either a mobile station that desires to know its location, or an entity that desires the location of a mobile station) requires payment to the service provider. In order to ensure that such payment can be collected, as well as to ensure privacy and for other concerns, it is critical to "authorize" the application. Authorization of an application refers to the act of verifying that there is "sufficient" identity and billing information. Such identity and billing information includes such things as: 1) billing address, and 2) authorization from the service provider to access the requested location information, and 3) agreement between the party to be billed and the billing entity (i.e., the service provider) regarding the terms and conditions under which requested location information will be provided. That identity and billing information is considered to be "sufficient" if it: 1) allows the service provider to bill and collect fees from the party using the location based services (e.g., providing the position location information) and 2) protects the privacy of anyone about whom location information will be made available.

It has typically been the case that applications that were accessed by a mobile station were run within a component that is within the network. Accordingly, the network components could control the application. However, in some applications currently being contemplated, there is a need to authorize applications that are run within the mobile station. Accordingly, there is a need for a method and apparatus for allowing such applications to be authorized before allowing the application to run or access position location information.

SUMMARY

The presently disclosed method and apparatus allows an application executed within a mobile station to be authorized directly by a mobile positioning center (MPC). The mobile station communicates with a component of the communication infrastructure, which in accordance with one embodiment of the disclosed method and apparatus, is a component within a cellular communication network infrastructure. A typical cellular communication network infrastructure includes a base station through which signals are transmitted over the air from a wireless mobile station and are received within the network. A mobile positioning center (MPC) is coupled to the base station using any one of a variety of potential configurations that are well known in the art. In accordance with the presently disclosed method and apparatus, the MPC is responsible for authorizing an application that is resident within the mobile station. The mobile station communicates directly with the MPC over a communication link through the base station and other infrastructure components. When the user of the mobile station attempts to run a location based service application within the mobile station, the mobile station will establish a communication link with the MPC. The mobile station will then request authorization for the mobile station to run the location based service application. The application within the mobile station shall only be allowed to run if such authorization is successful.

Various aspects and embodiments of the invention are described in further detail below.

BRIEF DESCRIPTION OF THE DRAWINGS

The disclosed method and apparatus will become more apparent from the detailed description set forth below when taken in conjunction with the following figures in which like reference characters identify like elements.

DETAILED DESCRIPTION

Figure 1:
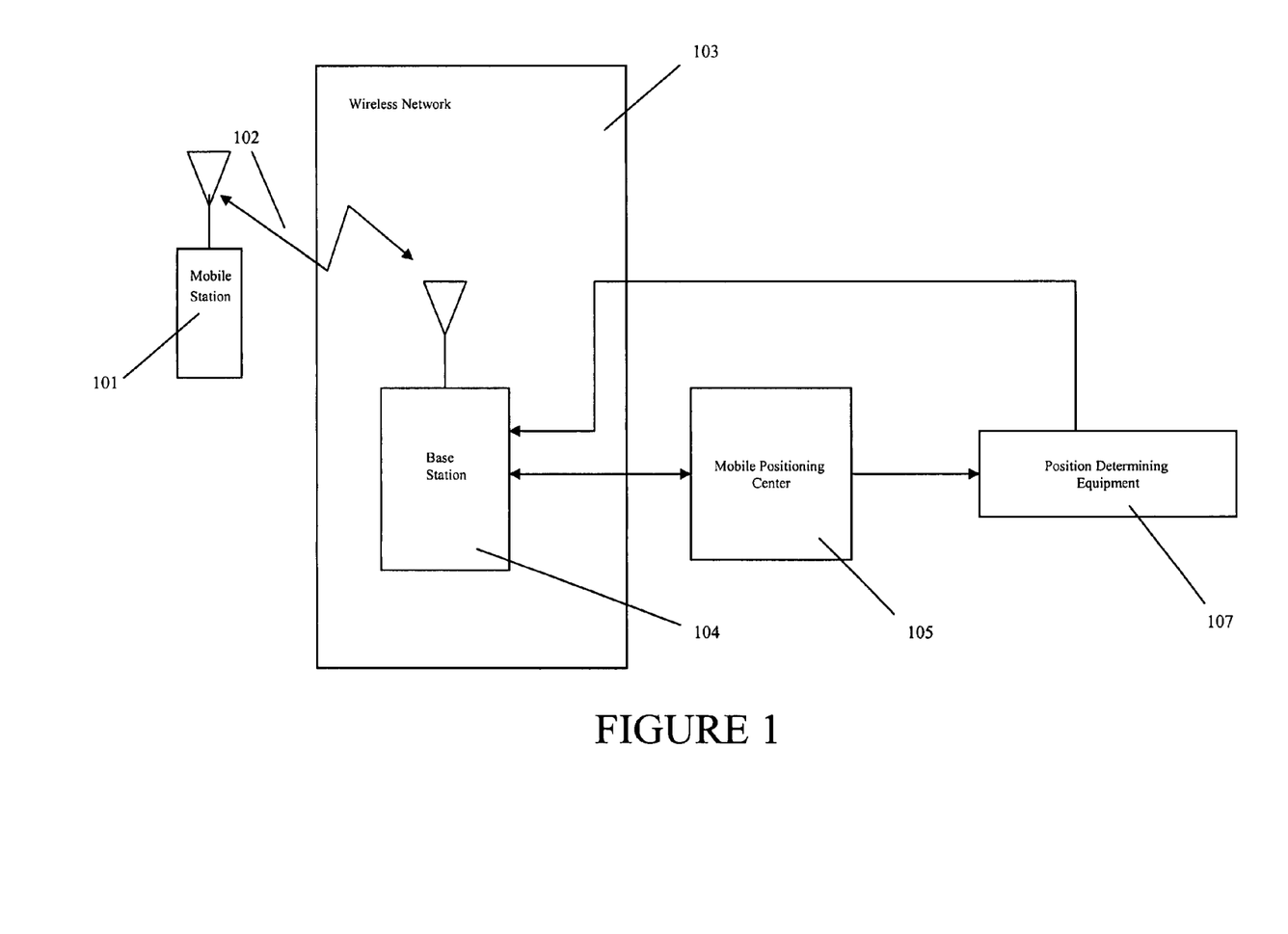
FIG. 1 is a simplified block diagram of a mobile station, wireless communication network, mobile positioning center, and position determining equipment in accordance with the disclosed method and apparatus.

FIG. 1 is a simplified block diagram illustrating a system 100 including a mobile station 101, wireless communication network 103, mobile positioning center (MPC) 105, and position determining equipment (PDE) 105 in accordance with the disclosed method and apparatus. The mobile station 101 may be any wireless device capable of running a location based service (LBS) application. For the purpose of this document, LBS applications include any program, applet, routine, or other such computer implemented algorithm that uses the location of either the mobile station in which the application is running or the location of another mobile station to provide information or service to a user. Examples of such LBS applications include programs that can: 1) identify the location of a mobile station being operated by another person to allow the LBS client (i.e., the person requesting the LBS service) to locate another person using a properly equipped mobile station; 2) locate a nearby product or service outlet and provide the user with directions to the outlet, such as an automatic teller machine or restaurant; 3) track a properly equipped mobile station, etc. Examples of wireless devices capable of running an LBS application include cellular telephones, wireless modems, personal information managers (PIMs), personal digital assistants (PDAs), etc.

As shown in FIG. 1, the mobile station 101 communicates over a wireless link 102 with the wireless network 103. The wireless network 103 includes at least a base station 104 capable of receiving information from, and transmitting information to, the mobile station 101 over the wireless link 102. For the purposes of this disclosure, the base station 104 includes various other components of the wireless network 103 which are not shown for the sake of simplicity, such as base station controllers (BSCs), mobile switching centers (MSCs), etc.

The base station 104 is coupled to the MPC 105 by any conventional communication medium, including, but not limited to cables, microwave links, satellite communication links, etc. Similarly, the MPC 105 is coupled to the PDE 107 by any conventional communication medium.

Figure 2:
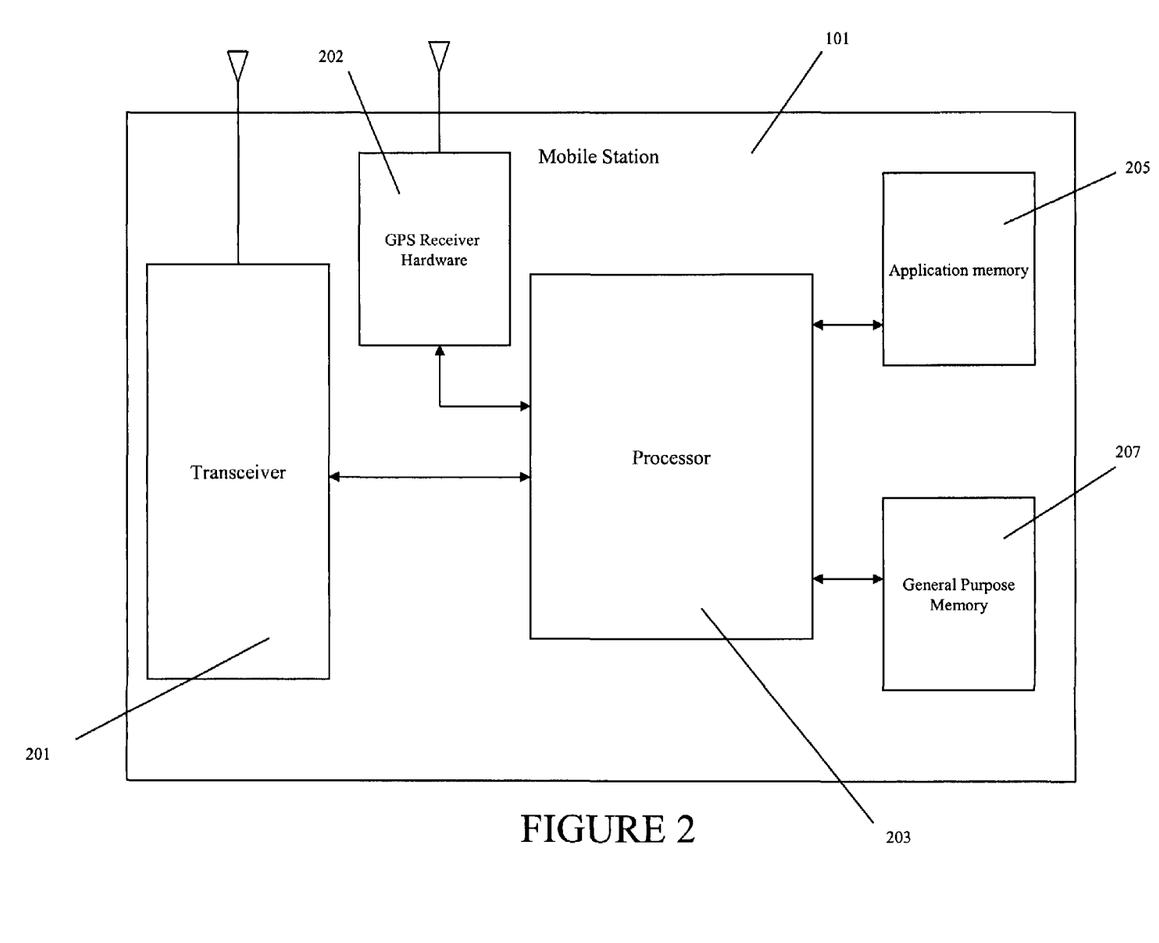
FIG. 2 is a simplified block diagram of the components of a mobile station in accordance with the disclosed method and apparatus.

FIG. 2 is a simplified block diagram of the components of a mobile station 101 in accordance with the disclosed method and apparatus. The mobile station 101 shown in FIG. 2 includes a transceiver 201, processor 203, application memory 205 and general purpose memory 207. The processor 203 is shown as one block. However, it should be understood by those skilled in the art that the functions disclosed as being performed by the processor 203 may be performed by a collection of discrete processors either acting in concert or operating independently. Accordingly, such a collection of processors may be either coupled together in order to perform the disclosed functions or they may operate completely independent of one another. Furthermore, in accordance with alternative embodiments of the disclosed method and apparatus, the application memory 205 and general purpose memory 207 may be combined into a single memory device that stores the information disclosed herein as being stored in these two memories 205, 207. In yet another alternative embodiment, the mobile station 101 might comprise several additional independent memory devices that share responsibility for storing information within the mobile station 101.

Figure 3:
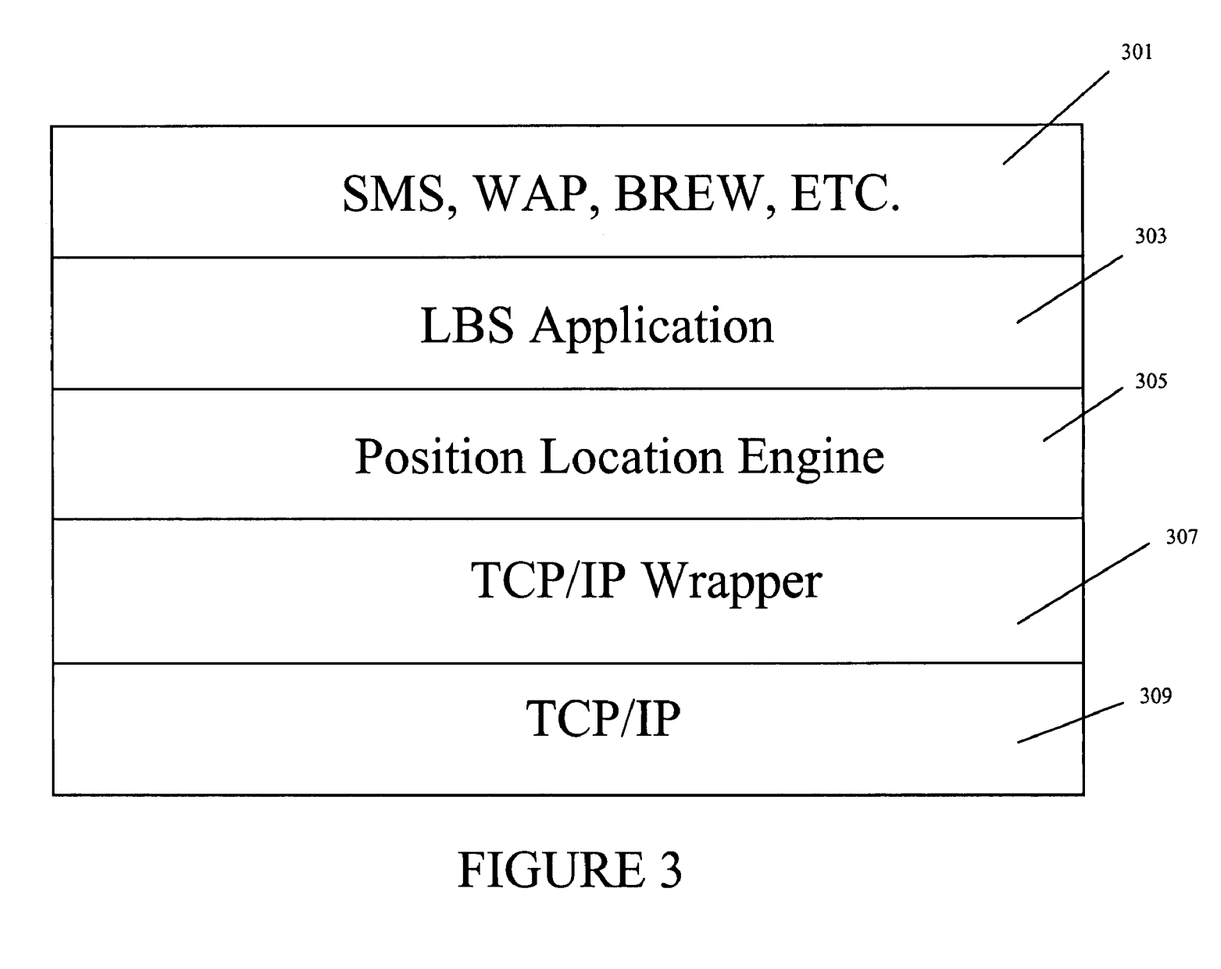
FIG. 3 is a schematic diagram of an example of a protocol stack used within one embodiment of the disclosed method and apparatus.

The processor 203 has several functions that operate in concert as a protocol stack. FIG. 3 is a schematic diagram of an example of a protocol stack used within one embodiment of the disclosed method and apparatus. For the purpose of this disclosure, a protocol stack is any set of routines or program instructions that operate together, typically with one routine building on and using the functions of another lower level routine or program. A first function within the protocol stack of FIG. 3 is the operating system 301. The operating system 301 is a foundational function upon which other functions build. That is, the operating system 301 includes functions that can be accessed and used by the other functions performed within the processor 203. In accordance with one embodiment of the presently disclosed method and apparatus, the operating system 301 is a Binary Run-time Environment for Wireless (BREW) operating system. Alternatively, the operating system 301 is a Wireless Application Protocol (WAP). In yet another alternative embodiment, the operating system is a Short Message Service (SMS) operating system. In yet another alternative, the operating system is a Java operating system, etc. Java is a trademark for the operating system of Sun Microsystems. Those skilled in the art will appreciate that the particular operating system used is not directly relevant to the presently disclosed method and apparatus for authorizing an LBS application 303 to run within the mobile station 101.

In accordance with one embodiment, an LBS application 303 runs on top of the operating system 301. In one example, the LBS application 303 may access and utilize user interface functions to receive information from the mobile station user through a conventional data input device, such as a keyboard or touch screen. The LBS application may also access and utilize the operating system functions to provide information back to the mobile station user through a liquid crystal diode (LCD) display screen.

One function of the LBS application is to provide the mobile station user with the ability to locate the mobile station, determine what points of interest and service outlets are in the vicinity of the mobile station (e.g., shops, automatic teller machines, restaurants, museums, etc.) and provide navigational directions and maps to the user based on a knowledge of the location of the mobile station and the location of particular service outlets and points of interest.

The LBS application 303 locates the mobile station 101 by accessing a position location engine 305. The position location engine 305 may be any function capable of determining the location of the mobile station 101. In one embodiment of the disclosed method and apparatus, the position location engine 305 is a component of a global positioning satellite (GPS) system. The position location engine 305 in this example includes a GPS receiver function that allows the mobile station (together with the GPS receiver hardware 202) to receive information from GPS satellites for the purpose of determining the location of the mobile station 101.

In addition, in one embodiment of the disclosed method and apparatus, the position location engine 305 requests and receives aiding information from the PDE 107. For example, in one embodiment, the mobile station requests information as to which satellites are "in view". If a satellite is in view, then the mobile station 101 should be able to receive and demodulate information from that satellite.

In addition, the mobile station 101 might request information regarding the locations of the in view satellites, information about correction factors to be used when calculating the location of the mobile station 101 using information received from the in view satellites, information regarding the amount of Doppler shift that the mobile station 101 might expect to encounter when receiving signals from the in view satellites, and other such useful information. This information enables the mobile station 101 to more rapidly detect and "acquire" satellites. Acquisition of a satellite refers to the process by which the mobile station 101 receives signals transmitted from the satellite and aligns the received information with local timing within the mobile station 101 in preparation for the mobile station 101 to interpret information modulated on the signals transmitted by the satellite. A further discussion is provided below regarding the process of receiving aiding information from the PDE 107.

FIG. 3 also shows a TCP/IP wrapper 307. The TCP/IP wrapper 307 is a protocol layer that provides support for sending and receiving messages in accordance with the well-known TCP/IP communication protocol. Accordingly, information that is to be transmitted by the mobile station 101 in accordance with the TCP/IP protocol is provided to the TCP/IP wrapper 307. The TCP/IP wrapper 307 then formats the information appropriately in accordance with the TCP/IP protocol specification so that other devices to which the information is to be transmitted can receive and interpret the information sent by the mobile station 101.

Once the TCP/IP wrapper 307 has formatted the information, the formatted information is passed to the TCP/IP layer 309. The TCP/IP layer 309 transmits the information in accordance with the TCP/IP protocol (i.e., the request/response ordering of the messages which constitute the handshake that takes place between a transmitting and receiving device in accordance with the TCP/IP protocol).

Figure 4:
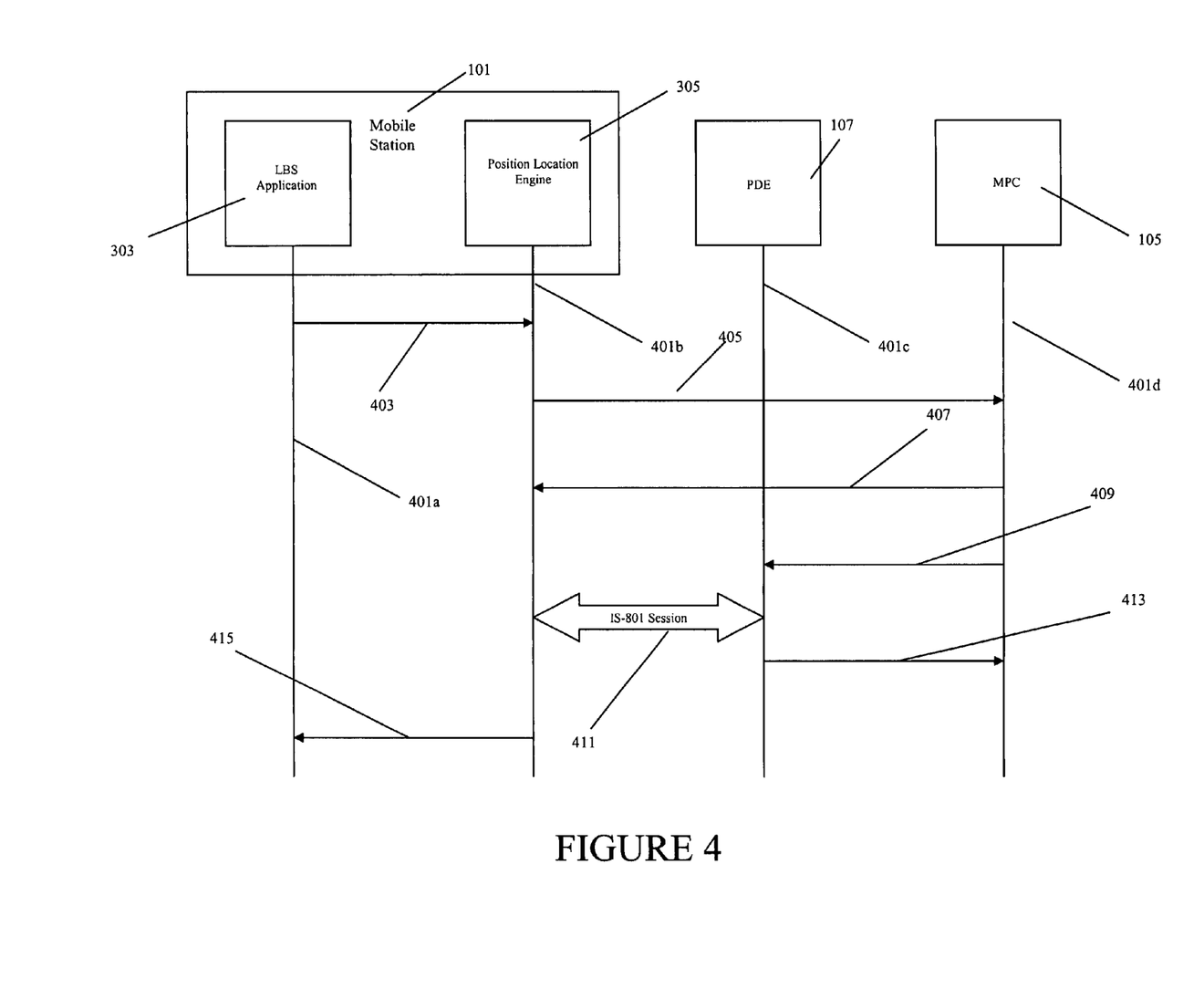
FIG. 4 is a schematic diagram showing the sequence of messages passed between various components of a system implementing the disclosed method and apparatus when an application within a mobile station is properly authorized.

FIG. 4 is a schematic diagram showing the sequence of messages passed between various components of a system 100 implementing the disclosed method and apparatus when an LBS application 303 within a mobile station 101 is properly authorized. Blocks shown across the top of FIG. 4 represent each of these components. These components include the LBS application 303, the position location engine 305, the PDE 107, and the MPC 105. A line 401a, 401b, 401c, 401d vertically descending from each component 303, 305, 107, 105 represents a passage of time. The points of the line closest to the components 303, 305, 107, 105 represent the most recent points in time.

Initially, the LBS application 303 invokes the position location engine 305. An arrow 403 which flows from the LBS application 303 to the position location engine 305 represents this step. In one particular embodiment, the position location engine 305 is a gpsOne™ application program interface (API). It should be noted that in some embodiments of the presently disclosed method and apparatus, the mobile station user might be notified that the LBS application is attempting to run. Some such embodiments require the user to verify that the user wishes to perform the function to be performed by the LBS application. If such notification and verification is performed, it is preferably performed before the LBS application invokes the gpsOne™ API.

In response to the invocation of the position location engine 305, the position location engine 305 sends a request for positioning to the MPC 105 using a predetermined mobile station/MPC (MS-MPC) protocol. In accordance with the MS-MPC protocol, the mobile station 101 initiates a TPC/IP session with the MPC 105. An arrow 405 shown in FIG. 4 represents the communication between the mobile station 101 and the MPC 105. The TCP/IP session from the mobile station 101 to the MPC 105 is established to a virtual IP address and port number to be specified by the operator. Once the TCP/IP session is established, the MS will send a "StartPositioningProcessRequest" message to the MPC 105. This message will contain a number of parameters.

In one embodiment of the presently disclosed method and apparatus, these parameters include the Universal Resource Locator (URL) of a content provider. The content provider is an entity that typically will lie outside the wireless communication network 103. The content provider provides information that is needed by the particular LBS application 303 that is attempting to run within the mobile station 101. For example, if the application were attempting to find the nearest restaurant, the content provider would be a database of information regarding restaurants and their locations. The content provider is accessible using the internet protocol (IP) address which can be derived from the provided URL.

In one embodiment of the presently disclosed method and apparatus, the parameters of the "StartPositioningProcessRequest" message sent to the MPC 105 also includes an application indicator. The application indicator identifies which particular LBS application 303 is attempting to run. Another parameter is indicates whether the user has consented or not to having the LBS application 303 run on the mobile station 101. Still another parameter is a mobile station identification value (MS_ID). The MS-ID indicates in which mobile station 101 the LBS application 303 is to run.

Yet another parameter indicates the MS positioning capability. Since mobile stations 101 may vary in their ability to process and handle position location information, this parameter indicates the capability of the mobile station 101. For example, a particular mobile station 101 may be only capable of performing position calculations based upon knowledge related to which cell (i.e., base station) or sector of a cell within a cellular telephone network the mobile station 101 is current communicating. Other mobile stations may be only capable of assisting a base station 103 in calculating the location of the mobile station. Such mobile stations are commonly referred to as operating in MS-assisted hybrid mode only. Other mobile stations may be capable of either assisting a base station in calculating the location of the mobile station or calculating the mobile station's location within the mobile station itself. Such mobile stations are commonly referred to as having both MS-Assisted hybrid and MS-based GPS modes of operation. Still further, some mobile stations may have no position location capability at all.

Another example of a parameter is cell/sector information. Cell/sector information allows the MPC to choose to perform cell/sector positioning rather then, or in combination with, GPS positioning. Several other parameters that are not relevant to the method and apparatus disclosed herein are also provided in the StartPositioningProcessRequest message.

In response to receiving the StartPositioningProcessRequest message 405, the MPC performs an authorization step to ensure that this particular user has access to the location application being requested. Additionally, the MPC checks to see whether there is a need for the position location engine 305 to determine the position of the mobile station 101. That is, there are instances in which a cached position (i.e., previously calculated, stored, and still valid) for the mobile station 101 may be used rather than having to recalculate the location of the mobile station 101. In other instances, the mobile station 101 may be located with sufficient accuracy for the purpose of the LBS application 303 using only knowledge of the location of the particular cell/sector(s) within the cellular communication network with which the mobile station 101 is communicating.

Figure 5:
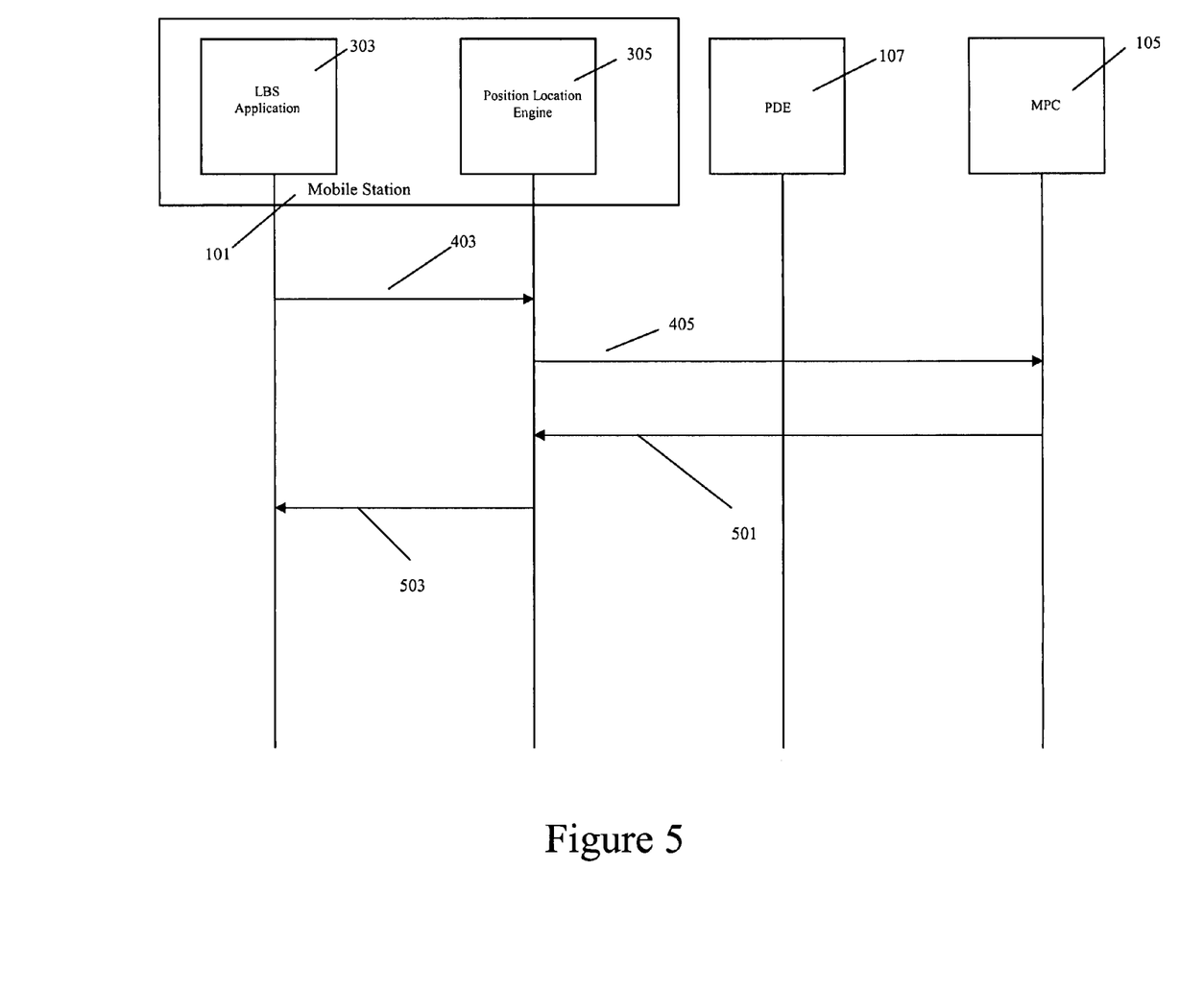
FIG. 5 is a schematic diagram showing the sequence of messages passed between various components of a system implementing when an application within a mobile station is not properly authorized.

Upon determining that a position location calculation needs to be made by the position location engine 305 within the mobile station 101, the MPC 105 responds to the position location engine 305. The response from the MPC 105 is dependent upon whether the MPC determines that the LBS application 303 within the mobile station 101 has the proper authority to calculate the location of the mobile station 101. The MPC 105 determines that the LBS application 303 either does or does not have the proper authority to run. The MPC 105 can determine that the LBS application does not have the authority to run either because the user has denied the LBS application the right to calculate the location of the mobile station 101 or the MPC 105 determines that the information regarding the LBS application 303 is insufficient to allow the LBS application to run. This may be because the user has not paid the required fee to allow the LBS application to access the LBS services or the information regarding the user is incomplete. Whether the LBS application has authority to run, a "StartPositioningProcessResponse" message 407 is sent from the MPC 105 to the mobile station 101. As is described in more detail below, depending upon the content of the StartPositioningProcessResponse message 407, the position location engine 305 is either instructed to perform a GPS "session" or not. FIG. 5 illustrates the message sequence if the MPC determines that the LBS application 303 is not authorized to run. Details of that sequence are deferred until further below in order to allow the complete sequence in which the LBS application is authorized to run to be described in the immediately following text.

A GPS session includes: 1) acquisition of the satellites necessary to calculate the location of the mobile station 101, 2) demodulation of the satellite navigational message, and 3) calculation of the location of the mobile station based upon the GPS information available to the mobile station 101.

In accordance with one embodiment of the presently disclosed method and apparatus, the StartPositioningProcessResponse message includes the following information:

1) A version number that indicates the version of the specification used to formulate the StartPositioningProcessResponse message;
2) the length of the StartPositioningProcessResponse message;
3) a positioning status message that indicates the method to be used to calculate the position of the mobile station. In accordance with one embodiment of the presently disclosed method and apparatus, the parameters that are used in this message indicate whether: a) the position location engine is to use GPS, b) a cached position, c) cell/sector information, d) whether the user has denied the request to allow the LBS application to calculate the location of mobile station 101; or e) whether the request is not authorized;
4) a PDE IP address, assuming that GPS is to be used to calculate the location of the mobile station 101;
5) a PDE port number used by a sensor interface application (SIA) (not shown) that operates in concert with the PDE 107 to assist the PDE 107 in communicating with other components remote to the PDE 107;
6) a value to indicate whether an estimate of the position of the mobile station 101 is included in the StartPositioningProcessResponse message; and
7) a time stamp to indicate the GPS time associated with the estimate of the location of the mobile station 101;
8) a latitude estimate of the position of the mobile station 101 provided in the format indicated by the Telecommunication Industry Association/Electronics Industry Association (TIA/EIA) standard IS-801-1 in the section of that standard entitled "Provide Location Response Message";
9) a longitude estimate provided in the format indicated by the TIA/EIA standard IS-801-1 in the section of that standard entitled "Provide Location Response Message";
10) a location uncertainty estimate provided in the format indicated by the TIA/EIA standard IS-801-1 in the section of that standard entitled "Provide Location Response Message";
11) a velocity estimate provided in the format indicated by the TIA/EIA standard IS-801-1 in the section of that standard entitled "Provide Location Response Message";
12) heading estimate provided in the format indicated by the TIA/EIA standard IS-801-1 in the section of that standard entitled "Provide Location Response Message"; and
13) a height estimate provided in the format indicated by the TIA/EIA standard IS-801-1 in the section of that standard entitled "Provide Location Response Message".

Upon determining that the LBS application is authorized, the MPC 105 provides a "GPOSREQ" message 409 to the PDE 107 in addition to providing the StartPositioningProcessResponse message 407 to the mobile station 101. The GPOSREQ message 409 to the PDE 107 seeds the PDE 107 with information that assists the PDE 107 to work together with the position location engine 305 in determining the location of the mobile station 101. In particular, the GPOSREQ message 409 provides the PDE 107 with information regarding the location of the base station 104 with which the mobile station 101 is in communication. This information allows the PDE 107 to determine the location of the mobile station 101 to within a couple of miles or less. The PDE 107 can then most effectively provide aiding information to assist the position location engine 305 within the mobile station 101 to more easily determine which satellites are in view and to acquire those satellites far more rapidly.

The position location engine 305, in addition to sending the StartPositioningProcessRequest message 405 will attempt to perform a mobile originated (MO) position location session 411 in accordance with the protocol laid out in TIA/EIA standard IS-801. However, unless the PDE 107 receives a GPOSREQ message 409, the PDE 107 will not response to a request for information from the position location engine 305 within the mobile station 101. This will be discussed in more detail below in the discussion of FIG. 5. The MO IS-801 session includes both messages to the position location engine 305 from the PDE 107 and messages from the position location engine 305 to the PDE 107. At the end of the MO IS-801 session, assuming that the session completed normally, the PDE 107 provides a message 413 to the MPC 105 to indicate the normal completion. Lastly, the position location engine 305 within the mobile station 101 sends a message 415 to the LBS application 303 in which the location of the mobile station 101 is provided.

FIG. 5 is a schematic diagram showing the sequence of messages passed between the LBS application 303, the position location engine 305, the PDE 107 and the MPC 105 when an application within a mobile station 101 is not properly authorized. The process shown in FIG. 5 starts the same as the process shown in FIG. 4. That is, the LBS application 303 initially invokes the position location engine 305 as shown in FIG. 5 with arrow 403. The position location engine 305 then generates a StartPositioningProcessRequest message 405 and conveys that message 405 to the MPC 105. However, in the case shown in FIG. 5, the MPC 105 denies the LBS application's attempt to gain access to the position location services of the PDE 107. Accordingly, the MPC 105 returns a StartPositioningProcessRequest message 501 to the position location engine 305 within the mobiles station 101 that indicates that access to the PDE 107 has been denied. Since the position location engine 305 does not have sufficient information from which to determine the location of the mobile station 101 in accordance with the LBS application's request, the position location engine 305 responds by returning a message 503 to the LBS application 303 that indicates the denial of access to the services of the PDE 107. At that point, the process ends and the LBS application 303 effectively stops running due to the failure of the mobile station 101 to receive information regarding the location of the mobile station 101. In an alternative embodiment, the LBS application 303 may continue to run, but will not be able to use the position location services provided by the PDE 107.

Figure 6:
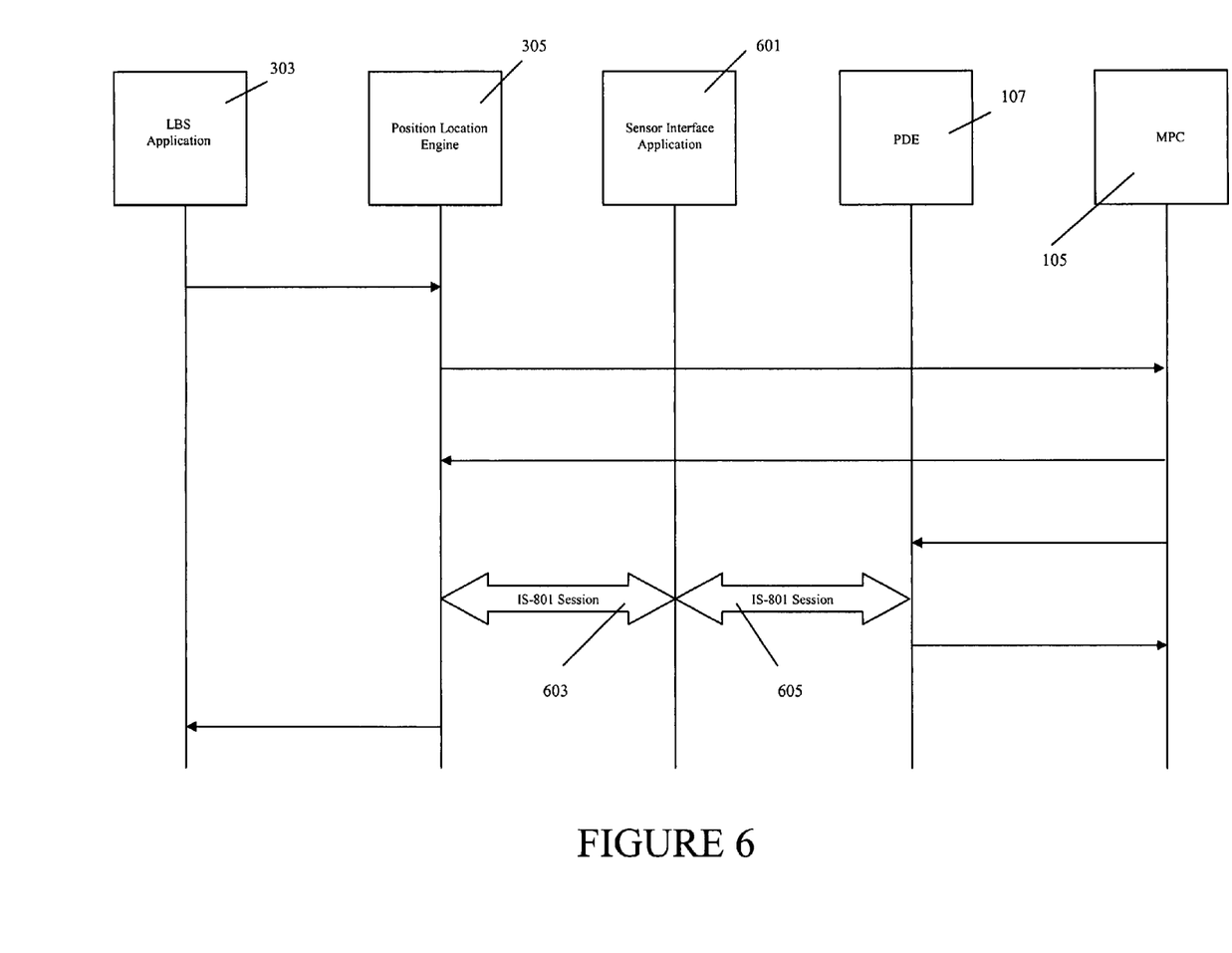
FIG. 6 is a schematic diagram showing the sequence of messages passed between various components of a system implementing an alternative embodiment of the disclosed method and apparatus when an application within a mobile station is properly authorized.

FIG. 6 is a schematic diagram showing the sequence of messages passed between components of an alternative embodiment of the disclosed method and apparatus when an application within a mobile station is properly authorized. In accordance with the embodiment shown in FIG. 6, a Sensor Interface Application (SAI) 601 is utilized to interface between the position location engine 305 and the PDE 107. The SAI 601 is merely present to translate communications between the position location engine 305 and the PDE 107 during the MO IS-801 session 603, 605. However, all of the other functions described above with regard to FIG. 4 are identical. In addition, the use of the SAI 601 would not change the sequence of messages shown in FIG. 5, since there is no authorization to perform the MO IS-801 session. It will be understood by those skilled in the art that several other intermediary devices may be placed between the components described herein without changing the nature and effect of the presently disclosed method and apparatus.

The description of the methods and apparatuses is provided to enable any person skilled in the art to make or use the invention defined by the claims appended hereto. Various modifications to these methods and apparatuses will be readily apparent to those skilled in the art. However, the generic principles defined herein may be applied to other embodiments of the methods and apparatuses without departing from the spirit or scope of the claimed invention. Thus, the claimed invention is not intended to be limited to the embodiments of the methods and apparatuses shown herein, but rather is to be accorded the widest scope consistent with the principles and novel features disclosed herein.

What is claimed is:

1. A method for authorizing an application run on a mobile station, including:
   attempting to run a location based service (LBS) application on the mobile station;
   invoking a position location engine within the mobile station using the LBS application;
   requesting authorization of the LBS application;
   communicating directly between the position location engine and a mobile positioning center (MPC) in a first communication session in order to have the MPC fulfill the request for authorization of the LBS application;
   establishing a second communication session between the position location engine and a Position Determining Equipment (PDE), independent of the first communication session, to attempt mobile originated position location;
   then, only if the LBS application is authorized, receiving within the mobile station information required to continue running the LBS application in response to the LBS application being authorized.

2. The method of claim 1 further including:
   if the LBS application has not been authorized, receiving a response message indicating that authorization failed; and
   in response to receipt of the response message, halting the LBS application.

3. The method of claim 1 wherein the LBS application that is attempted to run on the mobile station requires authorization from the MPC in order to receive all required information.

4. The method of claim 1 wherein the authorization of the LBS application to be run on the mobile station is independent of other authorization operations to be requested by the mobile station for the purpose of authorizing telephone communication.

5. The method of claim 4 wherein the authorization of the LBS application to be run is further independent of other authorization operations to be requested in order to authorize other applications.

6. The method of claim 3 wherein the authorization of the LBS application by the MPC allows the mobile station to communicate with other components.

7. The method of claim 6 wherein the other components include a position determination entity.

8. A mobile station (MS), comprising:
   a processor and a position location engine, said processor for running a location based service (LBS) application to determine a position of said MS in conjunction with said position location engine;
   apparatus for communicating directly with a mobile positioning center (MPC) in a first communication session to request authorization to run said LBS application;
   apparatus for initiating a mobile originated position location session, independent of the first communication session, to establish a communication session between the position location engine and a Position Determining Equipment (PDE) to determine the position of the MS; and
   apparatus for receiving from said MPC an indication whether running said LBS application is authorized and for allowing said processor to run said LBS application.

9. The MS of claim 8 wherein the position location engine is a GPS application program interface (API).

10. The MS of claim 8 wherein the LBS is a program that uses a location of the mobile station to provide a service to a user of the MS.

11. The MS of claim 8 wherein the LBS is an applet that uses a location of the mobile station to provide a service to a user of the MS.

12. The MS of claim 8 wherein the LBS is a routine that uses a location of the mobile station to provide a service to a user of the MS.

13. The MS of claim 8 wherein the LBS is a computer implemented algorithm that uses a location of the mobile station to provide a service to a user of the MS.

14. The MS of claim 13 wherein said computer implemented algorithm further identifies a location of another mobile station.

15. The MS of claim 13 wherein said computer implemented algorithm locates a nearby product and provides a user with directions to an outlet for said product.

16. The MS of claim 13 wherein said computer implemented algorithm locates a nearby service and provides a user with directions to an outlet for said service.

17. A mobile station configured to execute a Location Based Service (LBS) application, the mobile station comprising:

a processor configured to execute the LBS application; and a position location engine coupled to the processor and invoked by the LBS application, the position location engine configured to communicate, in a first communication session, a request for positioning to a Mobile Positioning Center (MPC) and receive from the MPC a position process response message in response to the request for positioning, the position location engine determining a location of the mobile station in response to a mobile originated communication session, independent of the first communication session, when the position process response message indicates the LBS application is authorized.

18. The mobile station of claim 17, wherein the position location engine is further configured to provide the location of the mobile station to the LBS application when the LBS application is authorized.

19. The mobile station of claim 17, wherein the position process response message comprises a positioning status message that indicates a method used to calculate the location of the mobile station.

20. The mobile station of claim 17, wherein the request for positioning comprises an application indicator configured to identify the LBS application.

21. The mobile station of claim 17, wherein the position location engine is further configured to initiate a mobile originated position location session in response to receiving the position process response message.

22. A method for authorizing an application run on a mobile station, the method comprising:

attempting to run a location based service (LBS) application on the mobile station;

establishing a TCP/IP communication session between a position location engine in the mobile station and a Mobile Positioning Center (MPC) in which the position location engine communicates directly with the MPC in order to have the MPC fulfill the request for authorization of the LBS application;

establishing a mobile originated position location session between the position location engine and a Position Determining Equipment (PDE), independent of the TCP/IP communication session, to determine a location of the mobile station; and communicating the location of the mobile station to the LBS application if the MPC authorizes the LBS application.

23. The method of claim 22, wherein establishing the TCP/IP communication session between the position location engine and the MPC comprises communicating a request for positioning from the position location engine to the MPC, the request for positioning including a Universal Resource Locator (URL) of a content provider associated with the LBS application.

* * * * *